(12) United States Patent
Nomura

(10) Patent No.: US 9,634,499 B2
(45) Date of Patent: Apr. 25, 2017

(54) ADJUSTING DEVICE, BATTERY PACK DEVICE, AND ADJUSTING METHOD

(71) Applicant: NEC Corporation, Tokyo (JP)

(72) Inventor: Youjirou Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 52 days.

(21) Appl. No.: 14/379,406

(22) PCT Filed: Jan. 25, 2013

(86) PCT No.: PCT/JP2013/051536
§ 371 (c)(1),
(2) Date: Aug. 18, 2014

(87) PCT Pub. No.: WO2013/121857
PCT Pub. Date: Aug. 22, 2013

(65) Prior Publication Data
US 2015/0303718 A1    Oct. 22, 2015

(30) Foreign Application Priority Data
Feb. 16, 2012    (JP) ................. 2012-031731

(51) Int. Cl.
*H02J 7/00* (2006.01)
*H01M 10/44* (2006.01)
(Continued)

(52) U.S. Cl.
CPC ......... *H02J 7/0016* (2013.01); *H01M 10/441* (2013.01); *H01M 10/482* (2013.01);
(Continued)

(58) Field of Classification Search
CPC ................................................... H02J 7/0016
(Continued)

(56) References Cited

U.S. PATENT DOCUMENTS

| 5,652,501 A | 7/1997 | McClure et al. |
| 6,373,226 B1 | 4/2002 | Itou et al. |

(Continued)

FOREIGN PATENT DOCUMENTS

| JP | 3-173323 | 7/1991 |
| JP | 10-032936 | 2/1998 |

(Continued)

OTHER PUBLICATIONS

International Search Report mailed Apr. 9, 2013.
(Continued)

*Primary Examiner* — Suresh Memula
(74) *Attorney, Agent, or Firm* — Finnegan, Henderson, Farabow, Garrett & Dunner, L.L.P.

(57) ABSTRACT

An adjusting device that adjusts voltage differences among a plurality of storage batteries that are connected in series is provided with: charging means that charges said storage batteries; each switching means that corresponds to each of said plurality of storage batteries, that connects a corresponding storage battery to said charging means in parallel when turned ON, and that releases the connection between the corresponding storage battery and said charging means when turned OFF; detection means that detects each voltage of said plurality of storage batteries; and control means that turns ON, from among a plurality of said switching means, the control-object switching means that corresponds to the charge-object storage battery, which has the lowest voltage that is detected by said detection means, from among said plurality of storage batteries, and moreover, that turns OFF switching means other than said control-object switching means.

11 Claims, 4 Drawing Sheets

(51) Int. Cl.
  *H01M 10/48* (2006.01)
  *H01M 10/42* (2006.01)
(52) U.S. Cl.
  CPC .......... *H02J 7/0014* (2013.01); *H02J 7/0021* (2013.01); *H01M 2010/4271* (2013.01)
(58) Field of Classification Search
  USPC ....................................................... 320/118
  See application file for complete search history.

(56) References Cited

U.S. PATENT DOCUMENTS

| | | | | |
|---|---|---|---|---|
| 2003/0146737 | A1 | 8/2003 | Kadouchi et al. | |
| 2010/0123433 | A1 | 5/2010 | Guo | |
| 2011/0068744 | A1* | 3/2011 | Zhu | H02J 7/0016 320/116 |
| 2011/0279085 | A1* | 11/2011 | Shigemizu | H01M 10/441 320/117 |
| 2014/0247005 | A1* | 9/2014 | Graham | H02J 7/0054 320/107 |
| 2015/0372514 | A1* | 12/2015 | Kobayashi | H01M 10/482 320/134 |

FOREIGN PATENT DOCUMENTS

| | | |
|---|---|---|
| JP | 2000-050516 | 2/2000 |
| JP | 2001-008373 | 1/2001 |
| JP | 2001-045672 | 2/2001 |
| JP | 2003-157908 | 5/2003 |
| JP | 2003-219572 | 7/2003 |
| JP | 2009-142071 | 6/2009 |
| JP | 2009-284591 | 12/2009 |
| JP | 2010-029015 | 2/2010 |
| JP | 2010-124682 | 6/2010 |
| JP | 2010-141970 | 6/2010 |

OTHER PUBLICATIONS

Extended European Search Report mailed Nov. 12, 2015 by the European Patent Office in counterpart European Patent Application No. 13749519.8.

Office Action mailed Sep. 13, 2016, by the Japanese Patent Office in counterpart Japanese Patent Application No. 2014-500148.

* cited by examiner

ADJUSTING DEVICE, BATTERY PACK DEVICE, AND ADJUSTING METHOD

CROSS-REFERENCE TO RELATED PATENT APPLICATIONS

This application is a National Stage Entry of International Application No. PCT/JP2013/051536, filed Jan. 25, 2013, which claims priority from Japanese Patent Application No. 2012-031731, filed Feb. 16, 2012. The entire contents of the above-referenced applications are expressly incorporated herein by reference.

TECHNICAL FIELD

The present invention relates to an adjusting device, a battery pack device, and an adjusting method, and more particularly relates to an adjusting device that adjusts voltage differences among a plurality of storage batteries that are connected together in series and to a battery pack device and adjusting method.

BACKGROUND ART

Battery packs are known that are made up from a plurality of storage batteries (such as a plurality of lithium ion secondary battery cells) that are connected together. In the following explanation, storage batteries are also referred to as battery cells.

Patent Document 1 discloses a battery pack system having a plurality of series cell units in which a plurality of battery cells are connected in a series, this plurality of series cell units being connected in parallel.

LITERATURE OF THE PRIOR ART

Patent Documents

Patent Document 1: Japanese Unexamined Patent Application Publication No. 2010-029015

SUMMARY OF THE INVENTION

Problem to be Solved by the Invention

In a series cell unit, voltage differences arise among battery cells due to individual differences of the battery cells and the degree of deterioration of the battery cells.

Charging of a series cell unit continues until any battery cell within the series cell unit attains a predetermined voltage. As a result, when voltage differences occur among battery cells within a series cell unit during charging, battery cells that have reached the predetermined voltage and battery cells that have not reached the predetermined voltage will be mixed within the series cell unit when charging is completed.

When the voltage differences among the battery cells upon completion of charging is great, the problem arises that accurately knowing the charged state of the series cell unit is problematic, and appropriate control of the charging and discharging operations of the series cell unit becomes difficult.

As a technology for reducing voltage differences among battery cells within a series cell unit, methods have been considered in which the voltage of battery cells (hereinbelow referred to as "high-voltage cells") that have higher voltage than other battery cells is decreased by connecting resistance to the high-voltage cells in parallel and consuming the energy of the high-voltage cells by using the resistance.

However, in a method of consuming the power of high-voltage cells by using resistance in order to decrease the voltage of the high-voltage cell, the problem arises in which power is consumed unnecessarily by the resistance. This wasted power consumption increases as the number of high-voltage cells increases.

It is therefore an object of the present invention to provide an adjusting device, a battery pack device, and an adjusting method that can solve the above-described problem.

Means for Solving the Problem

The adjusting device according to the present invention is an adjusting device that adjusts voltage differences among a plurality of storage batteries that are connected in series, the adjusting device including:

charging means that charges the storage batteries;

each switching means that corresponds to each of the plurality of storage batteries, that connects corresponding storage battery to the charging means in parallel when turned ON, and that releases the connection between the corresponding storage battery and the charging means when turned OFF;

detection means that detects each voltage of the plurality of storage batteries; and control means that turns ON, from among a plurality of the switching means, the control-object switching means that corresponds to the charge-object storage battery, which has the lowest voltage that is detected by the detection means, from among the plurality of storage batteries, and moreover, that turns OFF switching means other than the control-object switching means.

The battery pack device according to the present invention includes a plurality of storage batteries that are connected in series and the above-described adjusting device.

The adjusting method of the present invention is an adjusting method that is carried out by an adjusting device that includes: charging means that charges each of a plurality of storage batteries that are connected in series, and each switching means that corresponds to each of the plurality of storage batteries, that connects the corresponding storage battery to the charging means in parallel when turned ON, and that releases the connections between the corresponding storage batteries and the charging means when turned OFF; the adjusting method including:

detecting each voltage of the plurality of storage batteries; and from among the plurality of switching means, turning ON a control-object switching means that corresponds to a charge-object storage battery whose voltage is the lowest among the plurality of storage batteries, and moreover, turning OFF switching means other than the control-object switching means.

Effect of the Invention

The present invention is capable of reducing unnecessarily power consumption that occurs when decreasing voltage differences among battery cells that are connected in series.

MODE FOR CARRYING OUT THE INVENTION

An exemplary embodiment of the present invention is next described with reference to the accompanying drawings.

Figure 1:
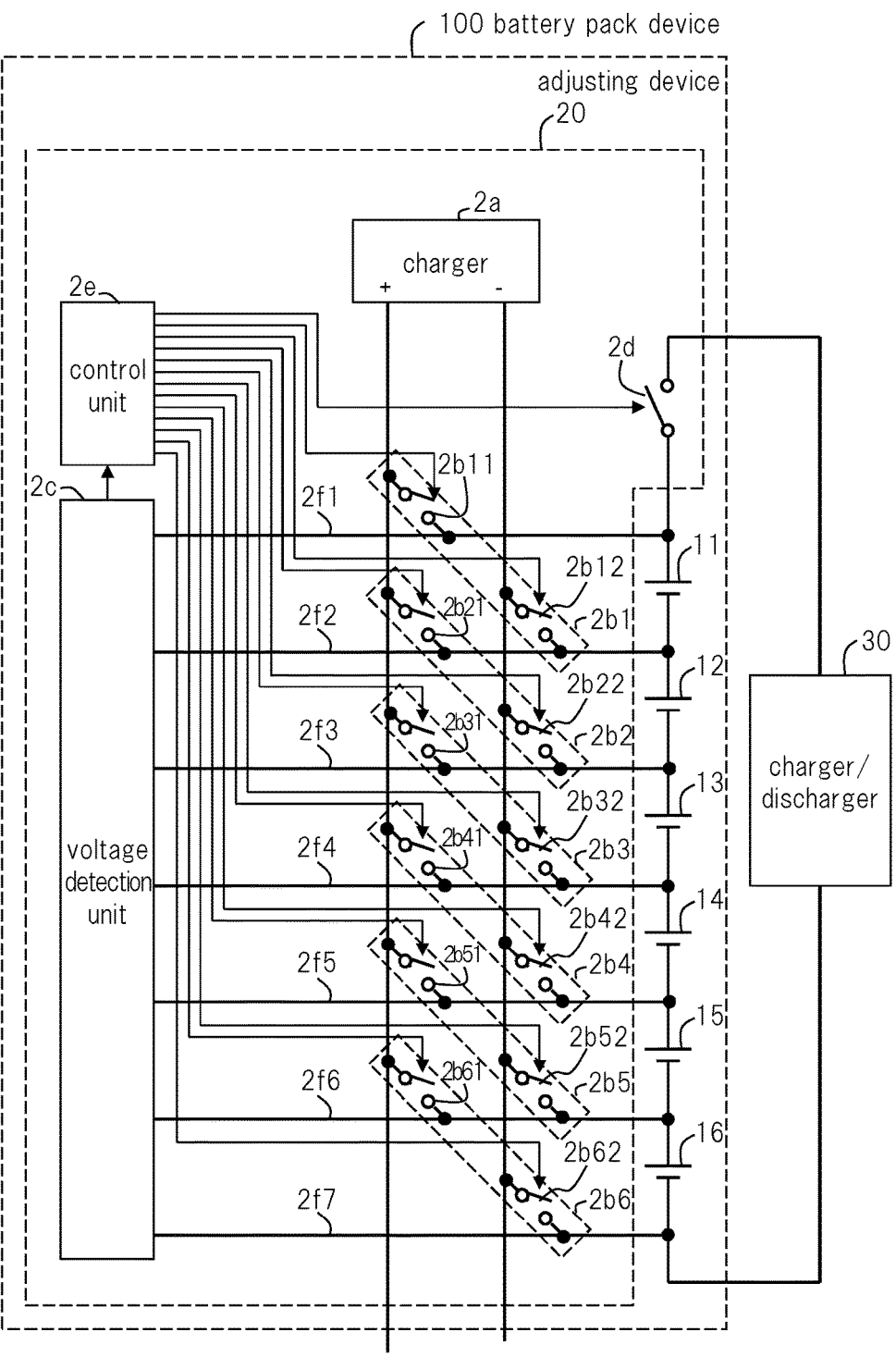
FIG. 1 is a block diagram showing battery pack device 100 of an exemplary embodiment of the present invention.

FIG. 1 is a block diagram showing battery pack device 100 of an exemplary embodiment of the present invention.

In FIG. 1, battery pack device 100 includes battery cells 11-16 and adjusting device 20 and is connected to charger/discharger 30.

Battery cells 11-16 are one example of the plurality of storage batteries. Battery cells 11-16 are, for example, a plurality of lithium ion secondary battery cells and are connected together in series. However, the battery cells are not limited to lithium ion secondary battery cells and can be modified as appropriate as long as they are secondary battery cells. In addition, although FIG. 1 shows six battery cells, the number of battery cells may be two or more.

Adjusting device 20 adjusts voltage differences among battery cells 11-16.

Adjusting device 20 includes charger 2a, switches 2b1-2b6, voltage detection unit 2c, operation switch 2d, and control unit 2e.

Charger 2a is one example of charging means.

Charger 2a is used for charging each of battery cells 11-16.

Switches 2b1-2b6 are one example of a plurality of switching means.

Switches 2b1-2b6 are provided for each of the battery cells. In the present exemplary embodiment, switches 2b1-2b6 are provided with a one-to-one correspondence for battery cells 11-16. For example, switch 2b1 corresponds to battery cell 11, and switch 2b6 corresponds to battery cell 16.

Switches 2b1-2b6 are each provided between a corresponding battery cell and charger 2a. When each of switches 2b1-2b6 is turned ON, the corresponding battery cell and charger 2a are connected in parallel, and when turned OFF, the connection of corresponding battery cell and charger 2a is released.

Voltage detection unit 2c is one example of detection means.

Voltage detection unit 2c detects the voltage of each of battery cells 11-16.

Operation switch 2d is one example of operation switching means.

Operation switch 2d is provided between battery cell 11 and charger/discharger 30.

Control unit 2e is one example of control means.

Control unit 2e comprehends the correspondence relation between switches 2b1-2b6 and battery cells 11-16.

Control unit 2e identifies from among battery cells 11-16 the battery cell (hereinbelow referred to as the "charge-object battery cell") in which the voltage that was detected by voltage detection unit 2c is lowest. The charge-object battery cell is one example of the charge-object storage battery.

Control unit 2e identifies, from among switches 2b1-2b6, the switch for connecting the charge-object battery cell with charger 2a, i.e., the switch (hereinbelow referred to as the "control-object switch") that corresponds to the charge-object battery cell. Control unit 2e turns ON the control-object switch and turns OFF switches other than the control-object switch from among switches 2b1-2b6.

In the present exemplary embodiment, control unit 2e turns OFF operation switch 2d and then turns ON the control-object switch, and moreover, turns OFF switches other than the control-object switch from among switches 2b1-2b6.

Charger/discharger 30 is one example of an apparatus that uses battery cells 11-16. Charger/discharger 30 includes a charging mode for charging battery cells 11-16 and a discharging mode for discharging battery cells 11-16.

Charger/discharger 30 includes, for example, a charger, a load, and a switch, and in the charging mode, uses the switch to connect the charger and battery cells 11-16, and in the discharging mode, uses the switch to connect the load with battery cells 11-16.

In the present exemplary embodiment, voltage detection unit 2c receives each of the voltages of battery cells 11-16 by way of voltage lines 2f1-2f7.

One end of each of voltage lines 2f1-2f7 is connected to voltage detection unit 2c. The other end of voltage lines 2f1-2f7 is connected to the high-potential side of battery cell 11, the connection node of battery cell 11 and battery cell 12, the connection node of battery cell 12 and battery cell 13, the connection node of battery cell 13 and battery cell 14, the connection node of battery cell 14 and battery cell 15, the connection node of battery cell 15 and battery cell 16, and the low-potential side of battery cell 16, respectively.

Switches 2b1-2b6 respectively include: switches 2b11 and 2b12, switches 2b21 and 2b22, switches 2b31 and 2b32, switches 2b41 and 2b42, switches 2b51 and 2b52, and switches 2b61 and 2b62.

Switches 2b11, 2b12, 2b21, and 2b22 are provided between the plus terminal of charger 2a and voltage line 2f1, between the minus terminal of charger 2a and voltage line 2f2, between the plus terminal of charger 2a and voltage line 2f2, and between the minus terminal of charger 2a and voltage line 2f3, respectively.

Switches 2b31, 2b32, 2b41, and 2b43 are provided between the plus terminal of charger 2a and voltage line 2f3, between the minus terminal of charger 2a and voltage line 2f4, between the plus terminal of charger 2a and voltage line 2f4, and between the minus terminal of charger 2a and voltage line 2f5, respectively.

Switches 2b51, 2b52, 2b61, and 2b62 are provided between the plus terminal of charger 2a and voltage line 2f5, between the minus terminal of charger 2a and voltage line 2f6, between the plus terminal of charger 2a and voltage line 2f6, and between the minus terminal of charger 2a and voltage line 2f7, respectively.

The operation is next described.

Figure 2:
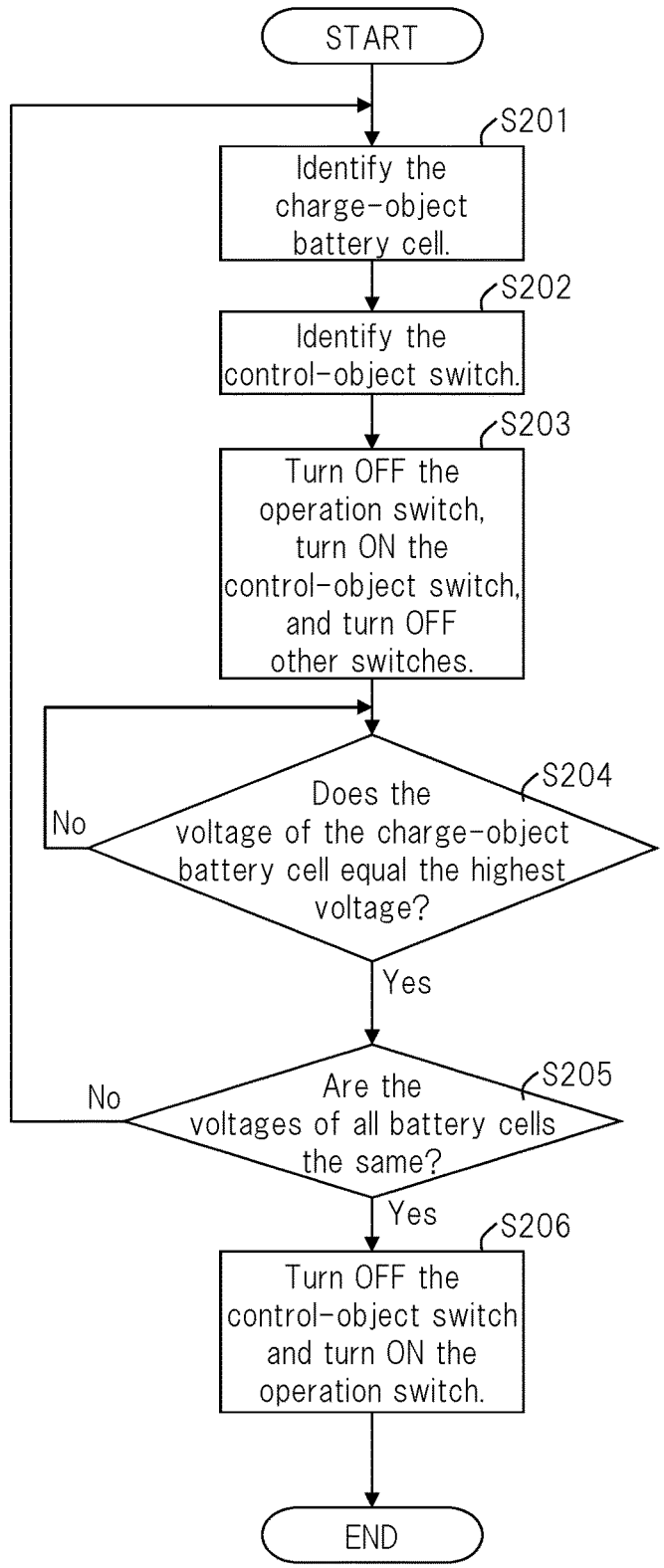
FIG. 2 is a flow chart for describing the operation of adjusting device 20.

FIG. 2 is a flow chart for describing the operation of adjusting device 20.

In the following explanation, charger/discharger 30 carries out charging of battery cells 11-16 in a state in which control unit 2e has turned OFF switches 2b1-2b6 and turned ON operation switch 2d to connect battery cells 11-16 to charger/discharger 30, and the operations that follow the time of completion of this charging are described. The operations described hereinbelow are not limited to operations that occur after charging has been completed.

Voltage detection unit 2c is assumed to use the voltages of voltage lines 2f1-2f7 to detect the voltages of battery cells 11-16 and to supply these detection results to control unit 2e.

Control unit 2e consults the detection results of the voltages of battery cells 11-16 to identify the charge-object battery cell (the battery cell having the lowest voltage among battery cells 11-16) (Step S201).

Control unit 2e next identifies the switch for connecting the charge-object battery cell and charger 2a, i.e., the control-object switch that is the switch that corresponds to the charge-object battery cell (Step S202).

Control unit 2e next turns ON operation switch 2d, then turns ON the control-object switch, and moreover, turns OFF switches other than the control-object switch from among switches 2b1-2b6 (Step S203).

In this way, the charge-object battery cell among battery cells 11-16 is connected in parallel to charger 2a and charged by charger 2a, whereby the voltage of the charge-object battery cell is increased.

Figure 3:
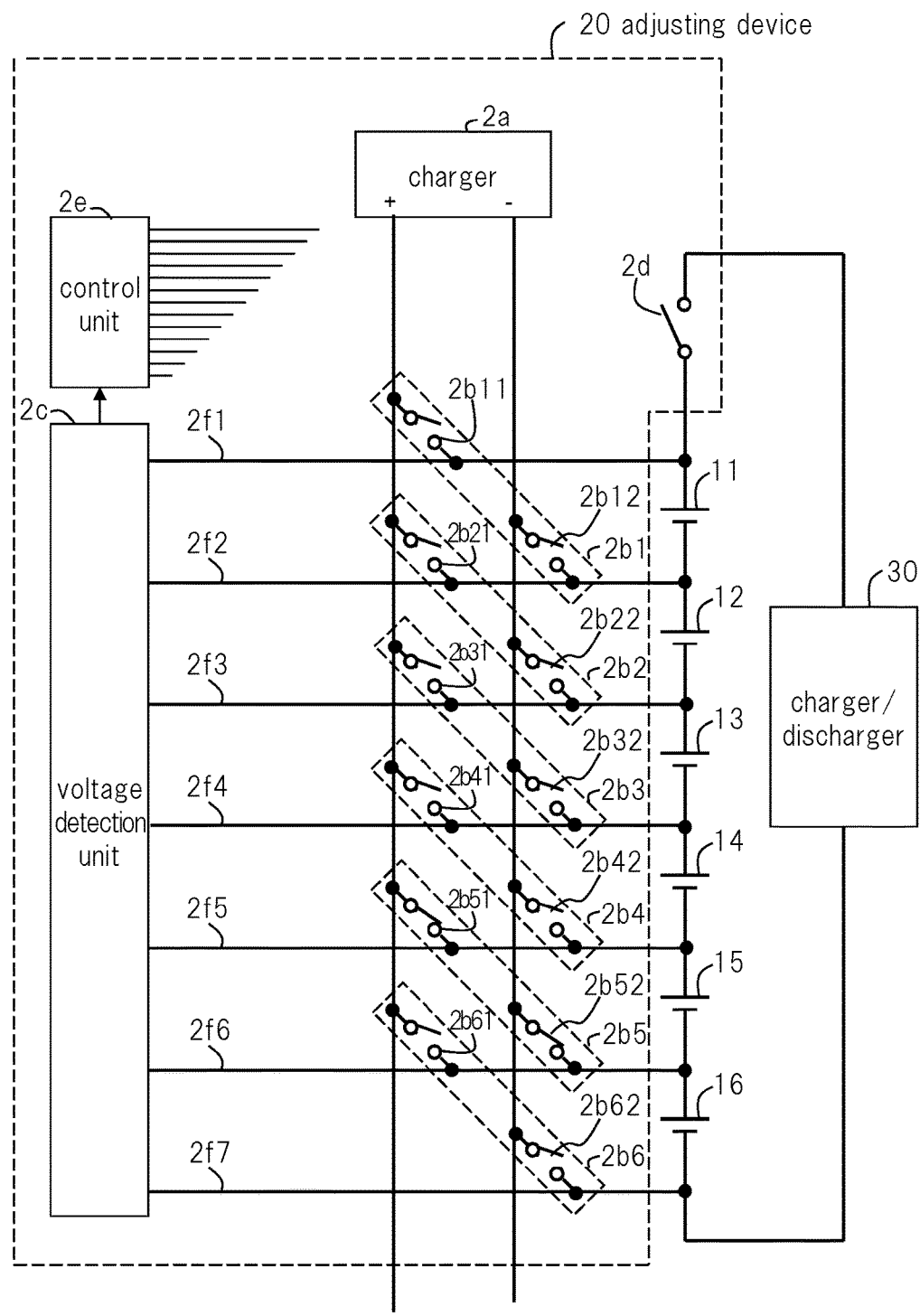
FIG. 3 is a view for describing an example of the ON/OFF states of switches.

FIG. 3 is a view for describing the ON/OFF states of switches 2b1-2b6 and the ON/OFF states of operation switch 2d when battery cell 15 is the charge-object battery cell.

In FIG. 3, switch 2b5 that corresponds to battery cell 15, and further, switches 2b51 and 2b52, are turned ON; switches 2b1-2b4 (switches 2b11, 2b12, 2b21, 2b22, 2b31, 2b32, 2b41, and 2b42) and switch 2b6 (switches 2b61 and 2b62) are turned OFF; and operation switch 2d is turned OFF. As a result, battery cell 15 among battery cells 11-16 is charged by charger 2a.

Control unit 2e then refers to the detection results of voltage detection unit 2c and waits until the difference between the voltage of the charge-object battery cell and the highest voltage among the voltages of battery cells 11-16 (hereinbelow referred to as simply "the highest voltage") reaches or falls below a predetermined value (hereinbelow referred to as the "predetermined value") (Step S204).

In the present exemplary embodiment, "0" is used as the predetermined value. As a result, in Step S204, control unit 2e waits until the voltage of the charge-object battery cell is equal to the highest voltage.

When the voltage of the charge-object battery cell is equal to the highest voltage (Step S204), control unit 2e judges that the voltages of battery cells 11-16 are mutually identical (Step S205).

When the voltages of battery cells 11-16 are not mutually identical in Step S205, the process returns to Step S201 and control unit 2e carries out charging of a new charge-object cell.

On the other hand, if the voltages of battery cells 11-16 become equal in Step S205, control unit 2e turns OFF the control-object switch to terminate the charging that uses charger 2a, turns ON operation switch 2d, and ends the operation (Step S206).

The effect of the present exemplary embodiment is next described.

According to the present exemplary embodiment, switches 2b1-2b6 have a one-to-one correspondence to battery cells 11-16. Switches 2b1-2b6 connect the corresponding battery cells to charger 2a in parallel when turned ON, and release the connection of the corresponding battery cell to charger 2a when turned OFF.

Voltage detection unit 2c detects the voltages of each of battery cells 11-16.

Control unit 2e turns ON, from among switches 2b1-2b6, the control-object switch that corresponds to the charge-object battery cell having the lowest voltage that was detected by voltage detection unit 2c among battery cells 11-16, and moreover, turns OFF switches other than the control-object switch.

As a result, despite the occurrence of voltage differences among battery cells 11-16, the voltage of the battery cell having the lowest voltage among battery cells 11-16 can be separately raised, whereby voltage differences among battery cells connected in a series can be reduced.

Accordingly, when charger/discharger 30 carries out charging of battery cells 11-16 and voltage differences occur among battery cells 11-16 due to deterioration of any of battery cells 11-16, these voltage differences can be reduced.

In addition, when any of battery cells 11-16 that has deteriorated is exchanged for a new battery cell and the voltage of the new battery cell was adjusted at the time of shipping the new battery cell such that the voltage of the new battery cell is lower than the voltages of the other battery cells, adjusting device 20 is able to make the voltage of the new battery cell identical to the voltage of the other battery cells.

The present exemplary embodiment can reduce the unnecessary consumption of power because it eliminates the need for consuming the power of battery cells by using resistance to reduce the voltage differences among battery cells that are connected in a series.

The above-described effect is also exhibited by adjusting device 20 that is made up of charger 2a, switches 2b1-2b6, voltage detection unit 2c, and control unit 2e.

Figure 4:
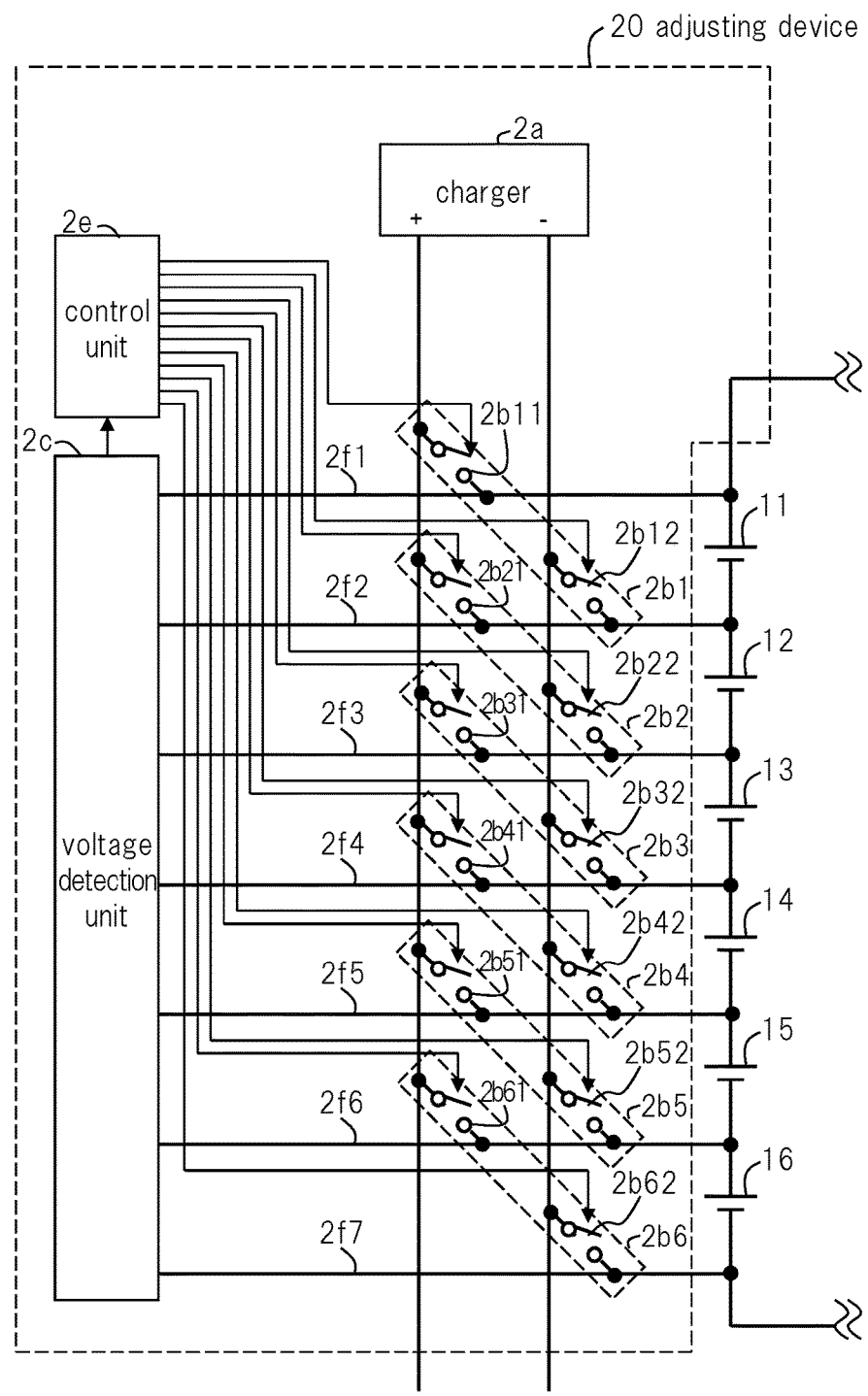
FIG. 4 shows adjusting device 20 that is made up of charger 2a, switches 2b-2b6, voltage detection unit 2c, and control unit 2e.

FIG. 4 shows adjusting device 20 that is made up of charger 2a, switches 2b1-2b6, voltage detection unit 2c, and control unit 2e.

In the present exemplary embodiment, voltage detection unit 2c receives the voltages of battery cells 11-16 by way of each of voltage lines 2f1-2f7 that are connected to each of battery cells 11-16.

Switches 2b1-2b6 are connected to battery cells 11-16 by way of voltage lines 2f1-2f7, respectively.

As a result, voltage lines 2f1-2f7 for voltage detection use can also be used as charging lines, and a simplification of the configuration can be achieved.

In addition, in the present exemplary embodiment, control unit 2e turns OFF operation switch 2d, then turns ON the control-object switch, and moreover, turns OFF switches other than the control-object switch among switches 2b1-2b6.

As a result, the voltage of the charge-object battery cell can be adjusted with high precision.

In the present exemplary embodiment, moreover, after turning ON the control-object switch, and moreover, after turning OFF switches other than the control-object switch among switches 2b1-2b6, control unit 2e refers to the detection results of voltage detection unit 2c and turns OFF the control-object switch when the difference between the voltage of the charge-object battery cell and the highest voltage is equal to or less than the predetermined value.

As a result, the voltage of the charge-object battery cell can be made uniform with voltage derived by subtracting a predetermined value from the highest voltage.

In addition, by using "0" as the predetermined value and repeating the above-described operations, the voltages of battery cells 11-16 can be made to all have the same voltage.

Control unit 2e identifies the battery cell having the lowest voltage among battery cells 11-16 as the charge-object battery cell, but the battery cell among battery cells 11-16 that has the lowest voltage, and moreover, that has a voltage that differs from the highest voltage by more than a predetermined threshold value may also be identified as the charge-object battery cell.

The predetermined value is not limited to "0" and can be modified as appropriate.

In addition, although voltage detection unit 2c and control unit 2e were shown as separate constructions, voltage detection unit 2c may also be incorporated in control unit 2e.

In the exemplary embodiment described hereinabove, the configuration shown in the figures is merely an example, and the present invention is not limited to this configuration.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art. This application claims the benefits of priority based on Japanese Patent Application No. 2012-031731 for which application was submitted on Feb. 16, 2012 and incorporates by citation all of the disclosures of that application.

EXPLANATION OF REFERENCE NUMBERS 100 battery pack device
11-16 battery cells
20 adjusting device
2a charger
2b1-2b6, 2b11, 2b12, 2b21, 2b22, 2b31, 2b32, 2b41, 2b42, 2b51, 2b52, 2b61, 2b62 switches
2c voltage detection unit
2d operation switch
2e control unit
2f1-2f7 voltage lines
30 charger/discharger

What is claimed is:

1. An adjusting device that adjusts voltage differences between a first storage battery and a second storage battery that are connected in series, comprising:
    a charging unit that charges the first and second storage batteries;
    a first switching unit provided between the first storage battery and the charging unit;
    a second switching unit provided between the second storage battery and the charging unit;
    a detection unit that detects a first voltage of the first storage battery and a second voltage of the second storage battery; and
    a control unit that, based on a determination that the first voltage is lower than the second voltage, turns ON the first switching unit and turns OFF the second switching unit.

2. The adjusting device of claim 1, wherein:
    detection unit receives the first voltage and the second voltage via voltage lines that are connected to the first and second storage batteries; and
    each of the first and second switching units connects with each of the first and second storage batteries via each of the voltage lines.

3. The adjusting device of claim 1, further comprising:
    an operation switching unit provided between the first and second storage batteries and an apparatus that uses the first and second storage batteries;
    wherein the control unit turns OFF the operation switching unit, then turns ON the first switching unit, and then turns OFF the second switching unit.

4. The adjusting device of claim 1, wherein the control unit, after turning ON the first switching unit, and turning OFF the second switching unit turns OFF the first switching unit when a difference between the first voltage and the second voltage becomes equal to or less than a predetermined value.

5. The adjusting device of claim 1, wherein the first storage battery and the second storage battery are a part of a plurality of storage batteries connected in series; wherein the detection unit detects a voltage for each of the plurality of storage batteries; wherein the first voltage of the first storage battery is of the lowest voltage among the detected voltages of the plurality of storage batteries.

6. The adjusting device of claim 1, further comprising:
    a first wire that connects a terminal of the first storage battery with the detection unit; and
    a second wire that runs across the first wire and is connected to the charger;
    wherein the first switching unit is disposed in a region where the first wire intersects with the second wires;
    wherein the first switching unit connects the first wire with the second wire when the first switching unit is turned ON; and
    wherein the first switching unit disconnects the first wire from the second wire when the first switching unit is turned OFF.

7. A battery pack device comprising,
    a first storage battery and a second storage battery that are connected in series; and
    an adjusting device comprising:
        a charging unit that charges the first and second storage batteries,
        a first switching unit provided between the first storage battery and the charging unit,
        a second switching unit provided between the second storage battery and the charging unit,
        a detection unit that detects a first voltage of the first storage battery and a second voltage of the second storage battery, and
        a control unit that, based on a determination that the first voltage is lower than the second voltage, turns ON the first switching unit and turns OFF the second switching unit.

8. An adjusting method performed by an adjusting device, the method comprising:
    detecting a first voltage of the first storage battery and a second voltage of the second storage battery; and
    based on a determination that the first voltage is lower than the second voltage:
        turning ON a first switching unit provided between the first storage battery and a charging unit, and
        turning OFF a second switching unit provided between the second storage battery and the charging unit.

9. The adjusting method of claim 8, wherein:
    the first voltage and the second voltage are received via voltage lines that are connected to the first and second storage batteries.

10. The adjusting method of claim 8, further comprising:
    turning OFF an operation switching unit provided between the first and second storage batteries and an apparatus that uses the first and second storage batteries;
    after turning OFF the operation switching unit, turning ON the first switching unit;
    after turning ON the first switching unit, turning OFF the second switching unit.

11. The adjusting method of claim 8, further comprising:
    after turning ON the first switching unit and turning OFF the second switching unit, turning OFF the first switching unit when a difference between the first voltage and the second voltage becomes equal to or less than a predetermined value.

* * * * *